3,454,481
PRODUCTION OF SULPHONIC ACIDS WITH ACTINIC RADIATION
Stanley Frederic Marrian, Aberdour, Fife, Scotland, assignor to British Hydrocarbon Chemicals Limited, Piccadilly, London, England, a British company
No Drawing. Filed May 20, 1965, Ser. No. 457,470
Claims priority, application Great Britain, June 12, 1964, 24,526/64
Int. Cl. C07c 3/24; B01j 1/10
U.S. Cl. 204—162    14 Claims The present invention relates to the production of sulphonic acids.

The production of sulphonic acids by the reaction of hydrocarbons with sulphur dioxide and oxygen in a sulphoxidation reaction is already known. The reaction is initiated by the illumination or irradiation of the reactants with actinic light or ionizing radiation, for example with ultraviolet or visible light, or with anhydrides such as acetic anhydride.

We have now found a new catalyst for initiating sulphoxidation which can replace acetic anhydride.

According to the present invention the process for the production of alkane sulphonic acids comprises irradiating a paraffin with actinic light or ionizing radiation in the presence of sulphur dioxide, oxygen, and between 0.01 and 10% by weight, based on the paraffin, of a monocarboxylic acid free from ethylenic unsaturation and having at least two carbon atoms in the molecule, and in the absence of added peracids. The paraffin used may be cyclic or open chain, but open chain paraffins are particularly preferred. In order to enable the sulphonic acids to be more readily separated from the paraffin, it is preferred to use an open-chain paraffin having at least 6 carbon atoms in the molecule.

The organic acids used as catalysts in the process of the invention are monocarboxylic acids containing at least two carbon atoms in the molecule. The acids should be free of ethylenic unsaturation. Water may be present in addition to the carboxylic acid. If no water is present suitable acids include the saturated aliphatic monocarboxylic acids, for instance the straight chain saturated aliphatic acids containing from 2 to 10 carbon atoms per molecule, and the branched chain aliphatic acids particularly those containing 6 to 9 carbon atoms per molecule. If water is present then the open chain carboxylic acids having more than 11 carbon atoms in the molecule also become effective catalysts. Aromatic acids can also be used, for instance benzoic acid. The optimum quantity of carboxylic acid to obtain the maximum rate of reaction for the minimum quantity of acid lies between 0.01 and 10%. It is preferred to use quantities of acid from 0.01 to 3% by weight, based on the feedstock. The amount of catalyst introduced initially will usually maintain reaction for some considerable time, so that intermittent addition of further carboxylic acid as required to maintain the reaction rate is usually sufficient.

The reaction conditions for the sulphoxidation reaction according to the process of the invention are conventional, except for the catalyst. With the catalysts or promoters of the invention irradiation with either U.V. light or visible light only as the actinic light gives satisfactory production rates of sulphonic acids. Instead of actinic light, ionizing radiation from e.g. a suitably shielded cobalt-60 source may be used with equally satisfactory results. The radiation as used herein may be referred to broadly as actinic radiation. As starting materials those compounds may be used which will react in a sulphoxidation reaction to give sulphonic acids. Suitable materials include normal and singly-branched paraffins, cycloparaffins such as cyclohexane, methylcyclopentane and methylcyclohexane.

It has been discovered that when the sulphoxidation reaction is carried out in the presence of these acids, the reaction rate is unexpectedly improved. Many of the acids are cheaper than the relatively expensive acetic anhydride hitherto used as initiator, and with many feedstocks smaller quantities of the catalyst according to the invention and lower reaction temperatures are required than with prior art catalysts.

EXAMPLE 1

(a) A continuous sulphoxidation was carried out in a Pyrex glass tube reactor of 500 ml. liquid capacity, irradiated by a "blended" lamp emitting both visible and ultraviolet radiation. The feedstock used was a $C_{10}$–$C_{13}$ normal paraffin fraction, sulphur dioxide and oxygen in a ratio of 2:1 by volume being fed to the base of the reactor through a sintered glass disc. The reactor was maintained full of liquid feed, the reaction temperature was 25° C., and the pressure atmospheric. The reaction product separated from the hydrocarbon phase, and was collected and analysed for active agent content by the method of Longwell and Maniece. Over a run of 105 hours duration the overall production rate of alkane sulphonic acids measured in this way was 14.6 gms./hour.

(b) This sulphoxidation was repeated under identical conditions except that 1.3 weight percent of acetic acid was added to the normal paraffin feed. Over a run of 70 hours duration, the average production rate of alkane sulphonic acid measured in the same way was 23.4 gms. per hour.

EXAMPLE 2

(a) A sample of $C_{13}$–$C_{18}$ normal paraffins containing inhibiting impurities was processed as in Example 1 in the absence of added acid, and only a few gms. of a dark coloured sulphoxidation product were obtained after 6 hours operation.

(b) When 1.3% of acetic acid was added to the paraffin feed, the rate of production (of the crude sulphoxidation product) increased to a rate of 25 gms. per hour. With the addition of 3% of acetic acid to the paraffin, the production rate of sulphoxidation product rose to 50 gms. per hour. This example illustrates the substantial improvement in reactivity obtained using these acids with feedstocks containing sufficient inhibiting impurities to prevent successful reaction using light initiators alone.

EXAMPLE 3

(a) A test was carried out in a reactor containing 200 mls. of liquid using cyclohexane and a mixture of sulphur dioxide and oxygen (2:1 volume ratio) as reagents at a temperature of 25° C., each test being continued for 5 hours. The reactor was of Pyrex glass in normal daylight and no irradiation was used. In the absence of added organic acids no measurable reaction occurred.

(b) A similar experiment was then carried out with the addition of 0.1 gm. of normal heptoic acid to the cyclohexane. Analysis of the product showed that cyclohexane sulphonic acid was produced at a rate of 6.1 gms./hour (i.e. 30.5 gms./litre reactor volume/hour).

EXAMPLE 4

A series of tests was then carried out in the reactor and under the conditions of Example 3, but using a $C_{10}$–$C_{13}$ fraction of normal paraffins instead of cyclohexane, and with the addition of 0.25 gms. (1.25 gms. per litre) of each of a number of organic acids to the hydrocarbon feed. The sulphonic acid formed was determined by the method of Longwell and Maniece, the rate of sulphonic acid formation found being shown in the following Table 1.

TABLE 1

Rates of sulphonic acid production with addition of various organic acids

| Organic Acid used: | Rate of sulphonic acid production: gm./hour |
|---|---|
| Acetic acid | 2.1 |
| Propionic acid | 1.9 |
| n-Butyric acid | 1.4 |
| iso-Butyric acid | 1.9 |
| Valeric acid | 1.3 |
| Trimethyl acetic acid | 1.0 |
| 2-ethyl butyric acid | 1.6 |
| n-hexoic acid | 1.4 |
| 3-methyl pentoic acid | 1.7 |
| Caprylic acid | 1.0 |
| 2-ethyl hexoic acid | 3.7 |
| n-Heptoic acid | 1.1 |
| Pelargonic acid | 0.8 |
| Iso-nonanoic acid | 3.5 |
| Capric acid | 2.9 |
| Phenyl acetic acid | 1.5 |
| Benzoic acid | 3.5 |
| m-Toluic acid | 1.6 |
| p-Toluic acid | 2.1 |

No reaction occurred with addition of formic acid, with unsaturated acids, nor with dibasic acids. Straight chain aliphatic carboxylic acids containing 11 carbon atoms or more also failed to promote reaction at a useful rate under these conditions.

I claim:
1. A process for the production of alkane sulphonic acids which comprises irradiating a paraffin, free from added peracid, with actinic radiation in the presence of sulphur dioxide, oxygen, and between 0.01 and 10% by weight, based on the paraffin, of a mono-carboxylic acid free from ethylenic unsaturation and having at least two carbon atoms in the molecule.

2. A process according to claim 1 in which the paraffin is an open chain paraffin.

3. A process according to claim 2 in which the paraffin has at least six carbon atoms.

4. A process according to claim 1 in which the quantity of carboxylic acid present is in the range 0.01 to 3% by weight based on the paraffin.

5. A process according to claim 1 in which the carboxylic acid is an aromatic acid.

6. A process according to claim 5 in which the aromatic acid is a toluic acid.

7. A process according to claim 5 in which the aromatic acid is benzoic acid.

8. A process according to claim 1 in which the carboxylic acid is an aliphatic acid.

9. A process according to claim 8 in which the aliphatic acid is a straight chain acid.

10. A process according to claim 8 in which the aliphatic acid is a branched chain acid having from 6 to 9 carbon atoms in the molecule.

11. A process according to claim 9 in which the straight chain aliphatic acid has from 2 to 10 carbon atoms.

12. A process according to claim 1 in which water is present together with the carboxylic acid.

13. A process according to claim 1 in which the irradiation is carried out with actinic light.

14. A process according to claim 1 in which the irradiation is carried out with ionizing radiation.

References Cited

UNITED STATES PATENTS

| 2,702,273 | 2/1955 | Kennedy | 204—162 |
| 3,260,741 | 7/1966 | Macknnon et al. | 260—513 |
| 3,325,387 | 6/1967 | Black | 204—162 |

OTHER REFERENCES

Orthner, Angew. Chem., 62 (1950), pp. 302–5.

HOWARD S. WILLIAMS, *Primary Examiner.*